(12) United States Patent
Gaillard (10) Patent No.: US 7,628,333 B2
(45) Date of Patent: Dec. 8, 2009

(54) PORTABLE ELECTRONIC DEVICE CAPABLE OF ALTERNATE DATA CONVEYANCE OPERATIONS RESPONSIVE TO AN INVARIABLE ACTIVATION COMMAND

(75) Inventor: Joël Gaillard, Nassau (BS)

(73) Assignee: G. Holdings Ltd., Nassau NP (BS)

( * ) Notice: Subject to any disclaimer, the term of this patent is extended or adjusted under 35 U.S.C. 154(b) by 780 days.

(21) Appl. No.: 10/552,912

(22) PCT Filed: Apr. 14, 2003

(86) PCT No.: PCT/IB03/01523

§ 371 (c)(1),
(2), (4) Date: Feb. 27, 2006

(87) PCT Pub. No.: WO2004/090805

PCT Pub. Date: Oct. 21, 2004

(65) Prior Publication Data

US 2006/0262035 A1 Nov. 23, 2006

(51) Int. Cl.
*G06K 19/06* (2006.01)
(52) U.S. Cl. ...................................................... 235/492
(58) Field of Classification Search ................. 235/380, 235/487, 492; 705/41
See application file for complete search history.

(56) References Cited

U.S. PATENT DOCUMENTS

| | | | |
|---|---|---|---|
| 4,746,787 A | 5/1988 | Suto et al. | |
| 4,800,255 A | 1/1989 | Imran | |
| 5,590,038 A | 12/1996 | Pitroda | |
| 5,734,154 A | 3/1998 | Jachimowicz et al. | |
| 5,917,754 A | 6/1999 | Pathak et al. | |
| 5,999,713 A * | 12/1999 | Reiner et al. | 710/301 |
| 6,044,470 A | 3/2000 | Kuriyama | |
| 6,112,987 A | 9/2000 | Lambert et al. | |
| 6,254,001 B1 | 7/2001 | Chan | |
| 6,360,954 B1 | 3/2002 | Barnardo | |
| 6,390,373 B1 | 5/2002 | Beyer et al. | |
| 6,402,039 B1 | 6/2002 | Freeman et al. | |
| 6,454,172 B1 | 9/2002 | Maeda et al. | |

(Continued)

FOREIGN PATENT DOCUMENTS

DE 4203748 8/1993

(Continued)

*Primary Examiner*—Daniel A Hess
(74) *Attorney, Agent, or Firm*—Fraser Clemens Martin & Miller LLC; Donald R. Fraser (57) ABSTRACT

The portable electronic device (10) comprises an electronic circuit capable of storing data therein, capable of processing data, and capable of data input and output; a control device (12) operatively linked to the electronic circuit (14), with an invariable activation command being issued when the control device is triggered; first and second data conveyance functions programmed in the electronic circuit; a cue receiver (18) for receiving a selectively emitted activation cue from a source (9) external to the portable electronic device; and a power connector or an internal power source (20) for providing power to the portable electronic device. In use, upon the control device being selectively triggered to issue the invariable activation command, the electronic circuit will accomplish the first data conveyance function if an activation cue was received by the cue receiver and the second data conveyance function if no cue was received by the cue receiver.

13 Claims, 3 Drawing Sheets

U.S. PATENT DOCUMENTS 6,454,173 B2 9/2002 Graves
2003/0019942 A1 1/2003 Blossom

FOREIGN PATENT DOCUMENTS

| | | |
|---|---|---|
| DE | 4205556 | 8/1993 |
| DE | 10146804 | 4/2003 |
| WO | WO 03/027949 A1 * | 4/2003 |

* cited by examiner

PORTABLE ELECTRONIC DEVICE CAPABLE OF ALTERNATE DATA CONVEYANCE OPERATIONS RESPONSIVE TO AN INVARIABLE ACTIVATION COMMAND

FIELD OF THE INVENTION

This invention relates to a portable electronic device capable of alternate data conveyance operations responsive to an invariable activation command.

BACKGROUND OF THE INVENTION

Conventional portable electronic or magnetic devices are used for many different applications. Such portable devices can be for example access devices such as keycards, identification devices, or credit or debit devices such as the so-called smart cards.

Electronic identification devices are widely used by banks, credit companies, stores, to allow automated monetary transactions without the assistance of a bank teller.

For conventional credit cards, a magnetic strip is encoded with a small amount of coded information identifying the cardholder, such as an identification code and a personal identification number (PIN). To access the information held by such cards after or during a transaction, a suitable transaction interface machine comprising an appropriate magnetic card reader is required. Transaction or other account-related information can be outputted on a display screen located on the transaction machine.

Some prior art identification or transaction cards incorporate greater storage capacity and data processing means in the form of a microchip carried by the plastic main body of a smart card. These smart cards can store more data than standard magnetic cards. These cards, however, still require the use of a card reader interface machine to access the information comprised thereon, and a supplementary screen on the interface machine is required to view their content.

Some prior art identification cards have been provided with an in-built display screen and an information decoder cooperating with each other to access, decode and visualize coded information comprised in a memory unit located on the card. These prior art devices, however, necessitate multiple controls thereon to accomplish different functions of the card.

SUMMARY OF THE INVENTION

The present invention relates to a portable electronic device, comprising:
  an electronic circuit capable of storing data therein, capable of processing data, and capable of data input and output;
  a control device operatively linked to said electronic circuit, with an invariable activation command being issued when said control device is triggered;
  a user interface device operatively linked to said electronic circuit;
  a data transceiver operatively linked to said electronic circuit;
  a cue receiver for receiving a selectively emitted activation cue from a source external to said portable electronic device;
  a data conveyance switching element operatively linked to said electronic circuit, said switching element being in an activated state upon an activation cue having been received by said cue receiver, and being in an inactive state when no activation cue was received by said cue receiver; and
  power means for providing power to said portable electronic device; wherein upon said control device being selectively triggered to issue said invariable activation command:
  if said switching element is in said activated state, a data exchange will be initiated through the instrumentality of said data transceiver for exchanging data between said electronic circuit and an external data exchange device;
  if said switching element is in said inactive state, data will be conveyed from said electronic circuit to said user interface device for communicating information to the portable electronic device holder.

In one embodiment, said user interface device is a display screen.

In one embodiment, wherein said data transceiver comprises a data transmitter and a data receiver distinct from said data transmitter.

In one embodiment, said cue receiver is said data receiver.

In one embodiment, said control device is a biometric parameter detector, such as a fingerprint scanner capable of obtaining a fingerprint scan, whereby said control device is triggered when the fingerprint scan matches a fingerprint image pre-saved in said electronic circuit.

In one embodiment, said control device is a button, and said control device is triggered when the button is pressed.

In one embodiment, said electronic circuit comprises said switching element.

In one embodiment, said electronic circuit comprises a microchip, and wherein said switching element is a series of instructions programmed onto said microchip.

In one embodiment, said switching element comprises a decisional logical circuit.

The invention also relates to a data exchange system comprising:
  a data exchange device comprising a first electronic circuit, a first data transceiver and a cue emitter; and
  a portable electronic device, comprising:
    a second electronic circuit capable of storing data therein, capable of processing data, and capable of data input and output;
    a control device operatively linked to said electronic circuit, with an invariable activation command being issued when said control device is triggered;
    a user interface device operatively linked to said electronic circuit;
    a second data transceiver operatively linked to said electronic circuit;
    a data conveyance switching element operatively linked to said electronic circuit, said switching element being in an activated state upon an activation cue having been received by said cue receiver, and being in an inactive state when no activation cue was received by said cue receiver; and
    power means for providing power to said portable electronic device; wherein upon said control device being selectively triggered to issue said invariable activation command:
  if said switching element is in its activated state, a data exchange will occur between said first data transceiver and said second data transceiver, thereby exchanging data between said data exchange device and said portable electronic device;
  if said switching element is in its inactive state, data is forwarded to said user interface device for communicating information to the portable electronic device holder.

The invention further relates to a portable electronic device comprising:
- an electronic circuit capable of storing data therein, capable of processing data, and capable of data input and output;
- a control device operatively linked to said electronic circuit, with an invariable activation command being issued when said control device is triggered;
- first and second data conveyance functions programmed in said electronic circuit;
- a cue receiver for receiving a selectively emitted activation cue from a source external to said portable electronic device; and
- power means, for providing power to said portable electronic device;

wherein upon said control device being selectively triggered to issue said invariable activation command, said electronic circuit will accomplish said first data conveyance function if an activation cue was received by said cue receiver and said second data conveyance function if no cue was received by said cue receiver.

The invention also relates to a method for data exchange with a portable electronic device of the type comprising: an electronic circuit capable of storing data therein, capable of processing data, and capable of data input and output, a control device operatively linked to said circuit, a user interface device operatively linked to said circuit, communication ports operatively linked to said circuit, a switching element operatively linked to said electronic circuit and being in a default inactive state, and power means for providing power to said portable electronic device, said method comprising the steps of:
- awaiting for an activation cue to be received at a predetermined one of said communication ports;
- if an activation cue is received at one of said communication ports, changing the state of said switching element from its default inactive state to an activated state; and
- selectively triggering said control device to issue an invariable activation command, whereby said method will further comprise one of the two following steps:
  - if said switching element is in its activated state, initiating a data exchange with an external data exchange device through at least one of said communication ports; and
  - if said switching element is in its inactive state, conveying data from said electronic circuit to said user interface device for communicating information to the portable electronic device holder.

In one embodiment, said activation cue is received at one of said communication ports distinct from another one of said communication ports used for data exchange with the external data exchange device.

In one embodiment, the additional following step occurs after selectively triggering said control device if said switching element is in said activated state:
- conveying data from said electronic circuit to said user interface device for communicating information to the portable electronic device holder.

DETAILED DESCRIPTION OF THE EMBODIMENTS

Figure 1:
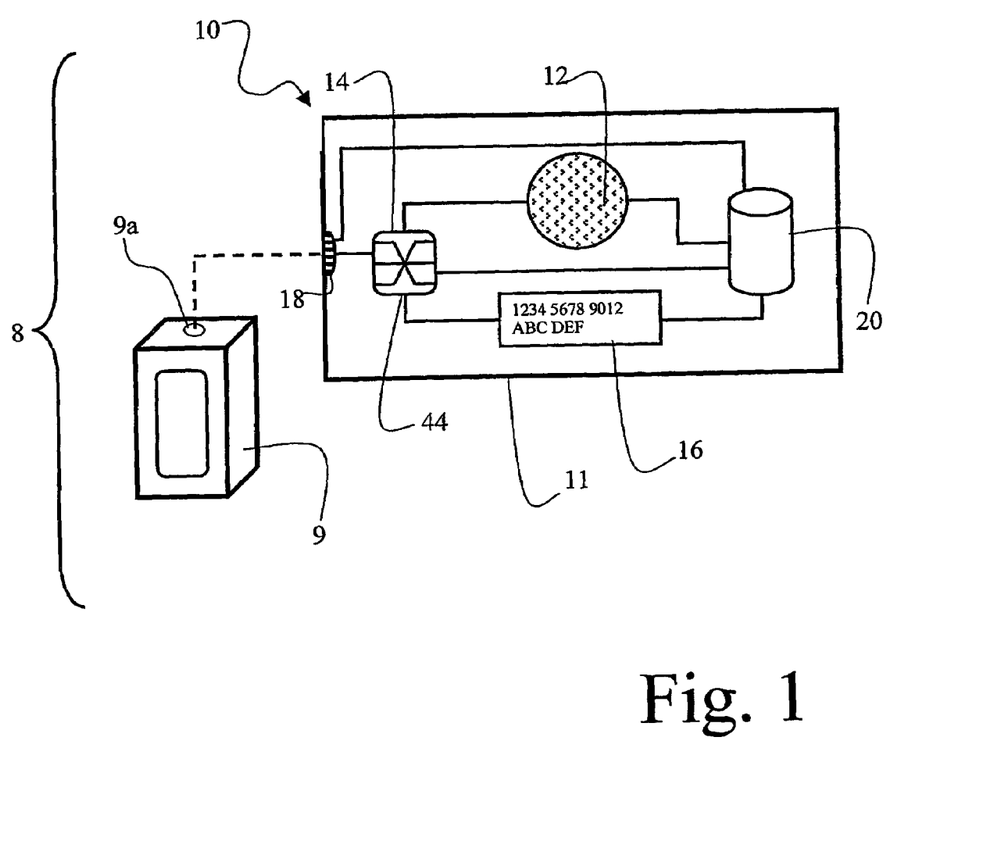
FIG. 1 is a schematic view of a data exchange system, showing a portable electronic device according to one embodiment of the present invention and a data exchange device, and further suggesting in dotted lines a communication link being established between the portable electronic device and the data exchange device.

FIG. 1 shows a data exchange system 8 comprising a portable electronic device 10 according to the present invention and a data exchange device 9. Portable electronic device 10 can be used for example for monetary transactions or identification purposes.

Device 10 comprises a rigid or semi-rigid main body 11 on which are operatively mounted: a control device 12, an electronic circuit 14, a display screen 16, a transceiver 18 and power means 20. Main body 11 can be made from a plastic material for example.

Figure 2:
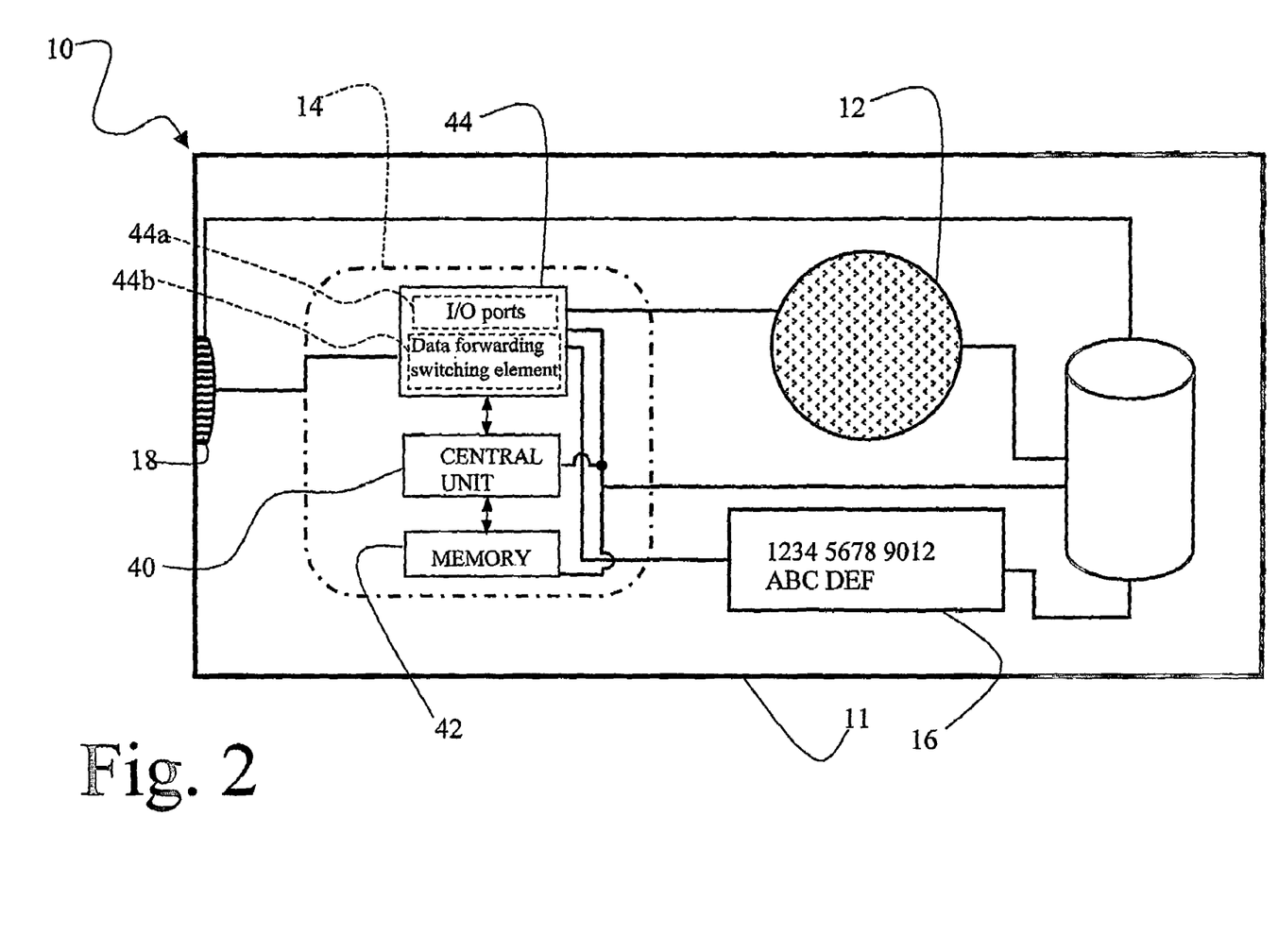
FIG. 2 is an enlarged schematic view of the portable electronic device of FIG. 1, showing the electronic circuit thereof in greater detail.

As illustrated in FIG. 2, electronic circuit 14 comprises a central unit 40 cooperating with a memory unit 42 and an Input/Output (I/O) controller 44. I/O controller 44 comprises I/O ports 44a and a data forwarding switching element 44b. I/O ports 44a handle the inputting and outputting of the data, and switching element 44b directs the data flow towards an appropriate destination, as detailed hereinafter.

Central unit 40 is operatively linked to I/O controller 44. Central unit 40 is able to process data electronically stored in memory unit 42, and is further capable of storing data thereon. Central unit 40 collaborates with I/O controller 44, and is capable of processing data incoming therefrom and of sending data thereto in order for this data to be appropriately outputted to components operatively connected to I/O controller 44.

Memory unit 42 of circuit 14 can comprise pre-stored data thereon. For example, this pre-stored data may comprise data related to the cardholder, such as the cardholder's name, address, his bank balance, his date of birth, or any other desired information. In one embodiment, the pre-stored data can further comprise validation data about the cardholder that will be used to authenticate the user, for example a personal identification number (PIN) or a fingerprint image. In another embodiment, the pre-stored data comprises electronic money usable to purchase goods and services according to known electronic wallet transaction methods.

Electronic circuit 14 comprises three essential functions: processing data, storing data, and inputting and outputting data to other components. The diagram of FIG. 2 shows a specific layout of operational blocks comprised within electronic circuit 14 and cooperating with each other to provide these three functions thereto. It is understood that alternate schematic circuit layouts could illustrate these three functions without departing from the scope of the present invention.

Electronic circuit 14 is operatively connected through the instrumentality of its I/O controller 44 to control device 12, screen 16 and transceiver 18.

In one embodiment, electronic circuit 14 is a programmable microchip, as found on smart cards.

Screen 16 is capable of displaying information transferred thereto from electronic circuit 14 through the instrumentality of I/O controller 44. Display screen 16 can be a LCD (liquid crystal display) screen embedded into main body 11 of the device. In one embodiment of the present invention, screen 16 is replaced with another user interface device, for example a speaker with voice emission software which would transform information forwarded thereto to speech understandable by the portable electronic device holder.

Figure 3:
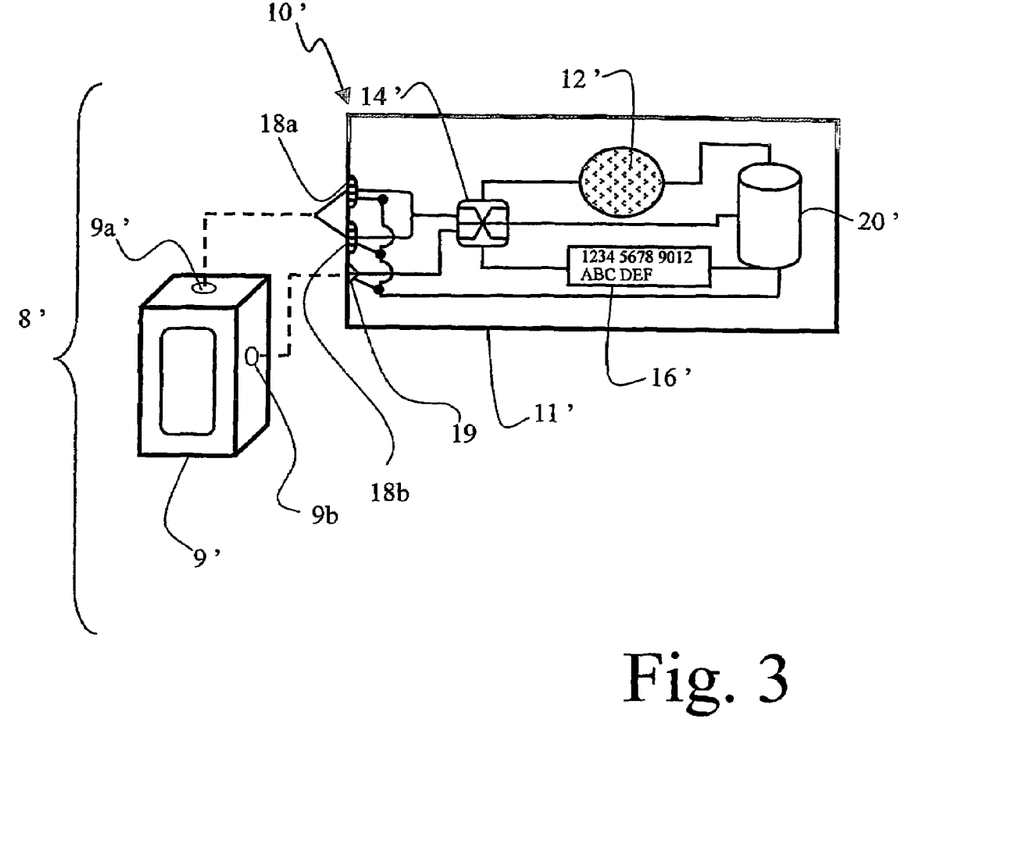
FIG. 3 is a view similar to FIG. 1, but showing a portable electronic device according to an alternate embodiment of the present invention cooperating with an alternate corresponding data exchange device.

Control device 12 can be any suitable device allowing the portable electronic device holder to selectively trigger a data conveyance operation as detailed hereinafter. Control device 12 can be for example a single manually activated button provided on the portable electronic device main body 11 (as schematically illustrated in FIGS. 1-3) which, when pressed, issues an activation command that triggers a particular data conveyance as described hereinbelow. Alternatively, control device 12 can include validation means such as a biometric parameter detector, for example a fingerprint scanner capable of obtaining a fingerprint image, which can be compared by central unit 40 to a fingerprint image pre-saved in memory unit 42. A fingerprint image match would validate that the user of portable electronic device 10 is authorized to use the latter, and then trigger the data conveyance operation. In another alternate embodiment, control device 12 could include validation means in the form of a keypad allowing the portable electronic device holder to type in a personal identification number (PIN) which will be compared by central unit 40 to a PIN pre-saved in memory unit 42, with a PIN match validating the portable electronic device user and triggering the data conveyance operation. In yet another embodiment, control device 12 is a validation button required to be pressed and on which a fingerprint scanner is provided: the card holder may thus concurrently apply his fingerprint on the scanner and press on the button to respectively validate and trigger the data conveyance operation. Any other suitable control device may be used.

Generally, control device 12 is considered to be triggered when the portable electronic device holder has successfully accomplished the necessary steps for control device 12 to issue an activation command, for example when the PIN or fingerprint scan was authenticated, or when the validation button was pressed, or when the button was pressed while the fingerprint scan was authenticated.

In an alternate embodiment of the present invention, control device 12 and LCD screen 16 can be replaced with a single touch-screen display, whereby information can be outputted, and whereby validation information can be captured.

As illustrated in FIG. 1, a communication link can be established between the electronic device transceiver 18 and the transceiver 9*a* of data exchange device 9.

Data exchange device 9 can be any sort of data exchange device comprising an electronic circuit (not shown) therein and a data transceiver 9*a* therein able to cooperate with transceiver 18 of device 10. In one embodiment, data exchange device 9 is another portable electronic device 10. Data exchange device 10 can alternately be a computer, an interface machine such as an automatic teller machine, or any other suitable data exchange device.

The communication link can be a contact or contactless link, for example an infrared or radio wave communication link. Thus, the electronic device transceiver 18 can be any suitable emitting and receiving device capable of communication with the data exchange device transceiver 9*a*. In an embodiment wherein circuit 14 is a microchip similar to the ones found on smart cards, transceiver 18 could include a series of electrical contacts located on the surface of the microchip destined to cooperate with a corresponding type of electronic device reader, as known in the art.

Transceiver 18 is also a cue receiver, whereby an activation cue can be received by electronic device 10 from data exchange device transceiver 9*a*. This activation cue is in the form of a data communication of a specific type which will be recognized by electronic device 10 as an activation cue, for example a predetermined bit sequence.

Switching element 44*b* can be any type of device allowing data to be conveyed according to alternate data conveyance operations in response to an activation cue being received by transceiver 18 or not, as described hereinafter. According to the embodiment shown in FIGS. 1 and 2, electronic circuit 14 comprises switching element 44*b*. In an embodiment wherein electronic circuit 14 comprises a microchip, switching element 44*b* can be a series of instructions programmed onto the microchip whereby the data conveyance operation will be automatically executed according to whether or not an activation cue was received by transceiver 18. Alternately, switching element 44*b* can comprise a decisional logical circuit. Generally, switching element 44*b* can be a physical structure, a virtual program, or both.

According to the invention, at any given time, switching element 44*b* will consequently be in either one of the two following states:

a) an activated state wherein an activation cue was received by transceiver 18; or b) an inactive state wherein no activation cue was received by transceiver 18.

By default, switching element 44*b* is in its inactive state.

Power means 20 can be any type of power source suitable for providing power to the portable electronic device components that require power, or for receiving power from an external source to re-distribute it to the portable electronic device components that require power. For example, power means 20 can be a battery, or a connector destined to be engaged by a corresponding external connector linked to a power source.

In the embodiment of FIGS. 1-2, power means 20 is illustrated as being connected to all the portable electronic device components; it will be obvious for those skilled in the art that power means 20 could be connected only to one or a few components that require a power source to operate, depending on the exact nature of portable electronic device 10 and of each of its components.

In use, upon control device 12 being selectively triggered by the portable electronic device holder, an activation command will be issued by control device 12 to electronic circuit 14, in reaction to which data will be conveyed within portable electronic device 10, and possibly additionally conveyed to and from portable electronic device 10, according to a predetermined data conveyance operation. The exact nature of this data conveyance operation will depend on the state of switching element 44*b*.

More particularly, if no activation cue is received by portable electronic device 10, then switching element remains in its inactive state. Upon control device 12 being selectively triggered by the portable electronic device holder, data will be forwarded from electronic circuit 14 to user interface device 16, for communicating information to the portable electronic device holder.

However, upon an activation cue being received by portable electronic device 10, switching element 44*b* switches to its activated state. If control device 12 is selectively triggered by the portable electronic device holder while switching element 44*b* is in this activated state, a data exchange will be initiated between portable electronic device 10 and the external data exchange device 9. This data exchange may be in the form of a data download from electronic device 10 to data exchange device 9, of a data upload to electronic device 10 from data exchange device 9, or of a data download and a data upload—with this last alternative being the most likely in many applications.

Thus, upon control device 12 being selectively triggered to issue an activation command by the portable electronic device holder, one of two alternate data conveyance operations will be initiated within portable electronic device 10. In the case where no activation cue was received by portable electronic device 10, data will be communicated to the portable electronic device holder by means of user interface device 16. However, if an activation cue was previously received by portable electronic device 10, a data exchange will be initiated between portable electronic device 10 and data exchange device 9.

It is noted that, according to the present invention, the activation command issued when control device 12 is triggered, is an invariable activation command. That is to say that the portable electronic device holder will not be able to select to issue different activation commands by means of control device 12 depending on whether the user considers that a data exchange operation should be accomplished with an external data exchange device 9, or whether the user wishes to display information on screen 16 on the basis of data stored in memory 42. The same invariable activation command will thus be issued upon control device 12 being triggered, and it is the state of switching element 44b, resulting from the receipt or non-receipt of an activation cue by portable electronic device 10, that will be decisive as to the type of data conveyance that will occur.

It is further noted that the above-mentioned triggering of control device 12 may comprise a single step, such as pressing a single button, or more than one step, such as pressing a button and concurrently applying one's fingerprint on a fingerprint scanner provided over the button, or typing in a PIN on a keypad provided on the portable electronic device. However, this control device triggering operation is accomplished in a same manner notwithstanding whether a data exchange between portable electronic device 10 and an external data exchange device 9 is to be accomplished, or whether a data conveyance occurs exclusively within portable electronic device 10, between electronic circuit 14 and screen 16. Consequently, it can be said that control device 12 will issue an invariable activation command when it is triggered, even if control device 12 may include more than one button, biometric parameter detector, etc. . . . that need to be concurrently or sequentially activated for control device 12 to issue a single, invariable activation command. Of course, this single invariable activation command will trigger alternate data conveyance operations responsively to the reception or non-reception of an activation cue, so ulterior alternate commands within electronic circuit 14 will occur depending on the data conveyance operation type, but the initial activation command will not depend on the reception or non-reception of an activation cue.

One example of a particular application of the present invention is the use of a portable electronic device 10 as a quick payment means, such as for paying public transportation fares. In such a case, data exchange device 9 would represent the payment debit machine, and portable electronic device 10 would be a payment card with pre-stored electronic money thereon. When the cardholder would want to use the public transportation services, he would approach the area of access to public transportation where a debit machine 9 would be provided. Debit machine 9 would continuously, or at regular time intervals, or when prompted to do so, emit an activation cue in the form of a predetermined contactless data transmission. Upon the cardholder approaching his payment card within a range allowing it to receive the activation cue from the debit machine, he could then trigger his control device 12 whereby a data exchange in the form of an electronic money transaction would occur between the payment card 10 and the debit machine 9. This data exchange could include any type of information required for electronic money transactions, as known in the art. For example, the following data exchange could occur, in addition to the reception of the activation cue:

a message is sent from portable electronic device 10 to debit machine 9 to inquire as to the fare for passage;

the fare for passage is transferred from debit machine 9 to payment card 10;

after verification by the card electronic circuit 14 that the card memory 42 still stores a sufficient amount of electronic money, payment card 10 then sends a right-of-passage message to data exchange device 9; and debit machine 9 sends a confirmation of right-of-passage to payment card 10, the latter then debiting the passage fare from the total electronic money amount stored in the card memory 42. Debit machine 9 also sends the required information to an exterior passage control device to allow passage of the cardholder to the public transportation services.

If, on the other hand, control device 12 is triggered at any time when switching element 44b is in its inactive state, i.e. not within the activation cue emission range of a public transportation service debit machine 9, then data from electronic circuit 14 will be sent to display screen 16 to display the total amount of electronic money remaining in card memory 42. No data exchange with an external debit machine would then be attempted by card 10.

Thus, in the above example, upon triggering control device 12, an invariable activation command would be issued that would result in two different possible data conveyance operations: if an activation cue has been previously received from a nearby debit machine 9, payment for right-of-passage would be made to allow the cardholder to use the public transportation services; on the other hand, if no activation cue has been previously received from a debit machine 9, then verification of the electronic money amount stored on the card memory 42 would be made.

Portable electronic device 10 could also have a plethora of other alternate purposes. For example, portable identification device 10 could be used as an electronic passport. This passport, when its control device is triggered, could be used to transmit identification data of the electronic passport owner to a data exchange device 9 if an activation cue has been received by the electronic passport, or to simply display this information on the display screen of the electronic passport if no activation cue has been received by the electronic passport.

The present invention is thus particularly advantageous, in that the portable electronic device holder needs only trigger control device 12 to issue an invariable activation command, for either the data exchange or the data display to occur. By means of the switching element 44b and transceiver 18 acting as a cue receiver, both located on portable electronic device 10, the proper data conveyance within portable transaction device will occur automatically upon this invariable activation command being issued. Thus, no alternate controls need to be provided on the portable electronic device 10. However, in one embodiment, other controls could be provided on portable electronic device 10 for accomplishing additional actions with portable electronic device 10.

It is noted that the data downloaded to an external data exchange device 9 during a data exchange therewith, and the data conveyed internally from electronic circuit 14 to display screen 16, may be the same data (as is the case in the above example of the electronic passport) or different data (as is the case in the above example of the payment card), depending on the purpose of portable electronic device 10.

The state of switching element 44b may be reset to its default inactive state upon one or more pre-determined conditions being met. In the embodiment where electronic circuit 14 is a microchip, these conditions may be programmed therein. For example, electronic circuit 14 may send a reset command to switching element 44b at regular time intervals, or a certain amount of time after switching element 44b has switched to its activated state.

According to one embodiment, when switching element 44b is in its activated state, upon selective triggering of control device 12, in addition to a data exchange occurring with an external data exchange device, an internal data conveyance from electronic circuit 14 to display screen 16 would also occur. Thus, according to this embodiment, an internal data conveyance would not be exclusive to the inactive state of switching element 44b, while a data exchange with an external data exchange device would be exclusive to the activated state of switching element 44b. In the above example of the payment card, this alternative of the invention would have the remaining amount of electronic money in the payment card displayed concurrently when a passage fare is paid with the card.

FIG. 3 shows an alternate data exchange system 8' comprising an alternate embodiment of a portable electronic device 10' and an alternate data exchange device 9', wherein elements that are similar to those of the first embodiment have primed reference numerals. Portable electronic device 10' includes a transceiver that comprises multiple communication ports, namely a data transmitter 18a, a data receiver 18b, and a cue receiver 19.

Data transmitter 18a and data receiver 18b could use distinct communication modes. For example, transmitter 18a could be a radio wave transmitter, and receiver 18b could be an infrared wave receiver.

Cue receiver 19, which is distinct from data receiver 18b in the embodiment of FIG. 3, can be of any type suitable for receiving an activation cue from data exchange device 9'. Data exchange device 9' is equipped with a corresponding cue emitter 9b. For example, cue emitter 9b can be a data transmission device emitting data by means of a different medium than that used by data receiver 18b—for example cue emitter 9b can emit radio waves while data transceiver 9a could be capable of emitting and receiving infrared waves. Cue receiver 19 could alternately comprise electrical contacts that would cooperate with corresponding electrical contacts 9b. In one embodiment, cue receiver 19 could be a button to be engaged by an automated finger device (the cue emitter 9b) in a slot of the data exchange device in which portable electronic device 10 is to be inserted. In any event, cue receiver 19 represents any suitable structure capable of receiving an activation cue from data exchange device 9, for indicating a data exchange opportunity between portable electronic device 10' and data exchange device 9'.

Any further modification, which does not deviate from the scope of the present invention, is considered to be included therein.

The invention claimed is:

1. A portable electronic device, comprising:
    an electronic circuit capable of storing data therein, capable of processing data, and capable of data input and output;
    a control device operatively linked to said electronic circuit, with an invariable activation command being issued when said control device is selectively triggered;
    a user interface device operatively linked to said electronic circuit;
    a data transceiver operatively linked to said electronic circuit, said data transceiver being for exchanging data between said electronic circuit and an external data exchange device, and for receiving a selectively emitted activation cue from a source external to said portable electronic device;
    a data conveyance switching element operatively linked to said electronic circuit, said switching element being in an activated state upon an activation cue having been received by said data transceiver, and being in an inactive state when no activation cue was received by said data transceiver; and
    power means for providing power to said portable electronic device;
    wherein upon said control device being selectively triggered to issue and invariable activation command:
    if said switching element is in said activated state, a data exchange will be initiated through the instrumentality of said data transceiver for exchanging data between said electronic circuit and an external data exchange device;
    if said switching element is in said inactive state, data will be conveyed from said electronic circuit to said user interface device for communicating information to the portable electronic device holder.

2. A portable electronic device as defined in claim 1, wherein said user interface device is a display screen.

3. A portable electronic device as defined in claim 1, wherein said data transceiver comprises a data transmitter, a data receiver distinct from said data transmitter, and a cue receiver distinct from said data receiver.

4. A portable electronic device as defined in claim 1, wherein said control device is a biometric parameter detector.

5. A portable electronic device as defined in claim 4, wherein said biometric parameter detector is a fingerprint scanner capable of obtaining a fingerprint scan, and whereby said control device is triggered when the fingerprint scan matches a fingerprint image pre-saved in said electronic circuit.

6. A portable electronic device as defined in claim 1, wherein said control device is a manually activated button, and whereby said control device is triggered when the button is pressed.

7. A portable electronic device as defined in claim 1, wherein said electronic circuit comprises said switching element.

8. A portable electronic device as defined in claim 7, wherein said electronic circuit comprises a microchip, and wherein said switching element is a series of instructions programmed onto said microchip.

9. A portable electronic device as defined in claim 1, wherein said switching element comprises a logical circuit.

10. A data exchange system comprising:
    a data exchange device comprising a first electronic circuit, a first data transceiver and a cue emitter; and
    a portable electronic device, comprising:
    a second electronic circuit capable of storing data therein, capable of processing data, and capable of data input and output;
    a control device operatively linked to said second electronic circuit, with an invariable activation command being issued when said control device is selectively triggered;
    a user interface device operatively linked to said second electronic circuit;

a second data transceiver operatively linked to said second electronic circuit;

a data conveyance switching element operatively linked to said second electronic circuit, and switching element being in an activated state upon an activation cue having been received by said second data transceiver, and being in an inactive state when no activation cue was received by said second data transceiver; and power means for providing power to said portable electronic device;

wherein upon said control device being selectively triggered to issue said invariable activation command:

if said switching element is in its activated state, a data exchange will occur between said first data transceiver and said second data transceiver, thereby exchanging data between said data exchange device and said portable electronic device;

if said switching element is in its inactive state, data is forwarded to said user interface device for communicating information to the portable electronic device holder.

11. A method for data exchange with a portable electronic device of the type comprising; an electronic circuit capable of storing data therein, capable of processing data, and capable of data input and output, a control device operatively linked to said circuit, a user interface device operatively linked to said circuit, communication ports operatively linked to said circuit, a switching element operatively linked to said electronic circuit and being in a default inactive state, and power means for providing power to said portable electronic device, said method comprising the steps of:

awaiting for an activation cue to be received at a predetermined one of said communication ports;

if an activation cue is received at one of said communication ports, changing the state of said switching element from its default inactive state to an activated state; and selectively triggering said control device to issue an invariable activation command, whereby said method will further comprise one of the two following steps:

if said switching element is in its activated state, initiating a data exchange with an external data exchange device through at least one of said communication ports; and if said switching element is in its inactive state, conveying data from said electronic circuit to said user interface device for communicating information to the portable electronic device holder.

12. A method as defined in claim 11, wherein said activation cue is received at one of said communication ports distinct from another one of said communication ports used for data exchange with the external data exchange device.

13. A method as defined in claim 11, wherein the additional following step occurs after selectively triggering said control device if said switching element is in said activated state:

conveying data from said electronic circuit to said user interface device for communicating information to the portable electronic device holder.

* * * * *

UNITED STATES PATENT AND TRADEMARK OFFICE
CERTIFICATE OF CORRECTION

PATENT NO.        : 7,628,333 B2                                    Page 1 of 1
APPLICATION NO. : 10/552912
DATED             : December 8, 2009
INVENTOR(S)       : Joël Gaillard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Second Day of November, 2010

David J. Kappos
*Director of the United States Patent and Trademark Office*